United States Patent [19]
Welsh et al.

[11] Patent Number: 5,340,844
[45] Date of Patent: Aug. 23, 1994

[54] POLYSTYRENE FOAM AND A PROCESS FOR MAKING THE SAME

[75] Inventors: Gary C. Welsh, Midland, Mich.; Eric K. C. Lee, Waterloo, Canada; Brian D. Dalke, Midland, Mich.

[73] Assignee: The Dow Chemical Company, Midland, Mich.

[21] Appl. No.: 873,419

[22] Filed: Apr. 24, 1992

[51] Int. Cl.$^5$ ................................................ C08J 9/00
[52] U.S. Cl. ........................................ 521/82; 521/97; 521/98; 521/130; 521/146; 521/908
[58] Field of Search ............... 521/82, 97, 98, 130, 521/146, 908

[56] References Cited

U.S. PATENT DOCUMENTS

| | | | |
|---|---|---|---|
| 4,312,910 | 1/1982 | Suh et al. | 428/220 |
| 4,344,710 | 8/1982 | Johnson et al. | 366/76 |
| 4,420,448 | 12/1983 | Krutchen | 264/53 |
| 4,424,287 | 1/1984 | Johnson et al. | 521/74 |
| 4,436,679 | 3/1984 | Winstead | 264/40.3 |
| 4,455,272 | 6/1984 | Schubert et al. | 264/53 |
| 4,470,938 | 9/1984 | Johnson | 264/50 |
| 4,473,665 | 9/1984 | Martini-Vvedensky | 521/79 |
| 4,559,367 | 12/1985 | Hurps et al. | 521/79 |
| 4,657,715 | 4/1987 | Myers et al. | 425/461 |

FOREIGN PATENT DOCUMENTS 517068 1/1976 Japan ................. B29D 27/00

OTHER PUBLICATIONS

C. M. Krutchen, *Ext PS Sht*, Documentation of U.S. EPA Data, pp. 3.4–C10–3.4–C11, Oct. 9, 1987.
U.S. Ser. No. 07/388,468 filed Aug. 2, 1989 (Welsh).

*Primary Examiner*—John Kight, III
*Assistant Examiner*—T. Mosley

[57] ABSTRACT

An improved polystyrene foam having less corrugation is disclosed which uses carbon dioxide as the blowing agent and 1–30 weight percent endothermic agent, such as water, with the weight based on the total carbon dioxide blowing agent and endothermic agent weight. This combination of carbon dioxide and endothermic agent decreases the corrugation of the thermoplastic foam, while just slightly increasing density, when the process parameters, including throughput, are equivalent to using only carbon dioxide. The process an also allow an increased foaming temperature and greater process throughput of an equivalent density thermoplastic foam at approximately equivalent corrugation levels when compared to the use of only using only carbon dioxide.

45 Claims, 1 Drawing Sheet

POLYSTYRENE FOAM AND A PROCESS FOR MAKING THE SAME

BACKGROUND OF THE INVENTION

1. Field of the Invention

This invention relates to an improved polystyrene foam prepared with an endothermic agent and carbon dioxide as the blowing agent. This invention also includes a process for making this improved polystyrene foam utilizing the endothermic agent and carbon dioxide as the only blowing agent. This invention is particularly suited for making polystyrene foam sheet having a thickness of less then about 0.5 inch.

2. History of the Art

Polystyrene foam, particularly in sheet form, is at the present time made from any number of blowing agents which may possess or cause one or more of the following undesirable characteristics: volatility, flammability, poor thermoforming characteristics, brittle foam sheet physical properties, high cost or an adverse effect to the ozone layer. Examples of these blowing agents would include aliphatic hydrocarbons and fully or partially halogenated hydrocarbons.

Some have experimented with blends of carbon dioxide and other blowing agents such as aliphatic hydrocarbons or fully or partially halogenate hydrocarbons. An example of this can be seen in U.S. Pat. Nos. 4,344,710 and 4,424,287. These patents, however, state that the use of a 100 percent carbon dioxide blowing agent has not been successfully employed in continuous direct injection foam sheet manufacturing (Column 1, lines 42–45 and lines 49–55 respectively) due to the extreme volatility. Use of these materials is said to produce corrugation and surface defects.

Others have developed methods and apparatuses for metering a gaseous blowing agent, such as an atmospheric gas, into a molten resin charge, such as polystyrene, in an accurate and precise manner. One example of this can be seen in U.S. Pat. No. 4,470,938. The apparatus of this patent meters discrete uniform volumetric charges of gaseous blowing agent into the molten resin using a free piston-cylinder combination which is given notice power by the supply gas source.

Still others, in U.S. Pat. No. 4,455,272, have formed polystyrene foam by extruding polystyrene, a nucleating agent, a physical blowing agent, and water where the physical blowing agent and water are injected separately or together into extruder as a blowing agent. The product produced has small cells at junction points between membranes of the foam. The patent states that extrusion processes for producing such foam are well known in the art and are normally based on known prior art physical blowing agents such as lower hydrocarbons and halogenated hydrocarbons, including propane, normal and isobutane, all of the isometric pentanes and hexanes and halogenated hydrocarbons exemplified by Freon 11, trichlorofluoromethane and Freon 12, dichlorodifluoromethane, but that also in some cases chemical blowing agents have been used. It is also noted in the patent that the water provides an extra amount of vapor pressure for the production of low density foams and also produces a large amount of evaporative cooling. The amount of water used ranges from 0.5 to 5 weight percent based upon the resin. The patent also notes that the amount of talc should be in the range from 0.01 to 0.3 weight percent based on the resin. More than 0.3 weight percent produces a product with very small cell structures resulting in low compressive strength.

A typical current commercial polystyrene foam sheet extrusion process may use a tandem extrusion process (two extruders in series). The first extruder melts the polymer to produce a polymer melt. A high pressure metering pump would then deliver blowing agent to the polymer melt at the end of the first extruder where mixing is initiated prior to entering the second extruder where further mixing and cooling of the blowing agent and the polymer melt occurs. After exiting the second extruder the polymer melt then passes through and becomes a foam structure at an annular die. The foam structure, in the shape of an annular tube, is then stretched over a forming mandrel. The annular tube coming off the mandrel is then slit and opened to form a sheet which is then gathered on one or more rolls. The sheet is then aged and then thermoformed into a foam sheet packaging article.

The use of an endothermic agent and carbon dioxide as the sole blowing agent avoids many of the problems of other blowing agents and blends of other blowing agents with carbon dioxide. The use of carbon dioxide in liquid form avoids the problems of handling a gas.

The process of the present invention can produce a thermoplastic foam having a greater density and less corrugation than a comparable thermoplastic foam produced using only carbon dioxide. It can also produce, at a increased die temperature, greater quantities of a thermoplastic foam having a lower density with an equivalent corrugation to a thermoplastic foam in an equivalent process for producing an equivalently corrugated thermoplastic foam produced using only carbon dioxide. Also, under equivalent process conditions, the thermoplastic foam of the present invention has less corrugation than a comparable thermoplastic foam produced using only carbon dioxide at the same density.

Thus the invention is polystyrene foam blown solely with carbon dioxide and an endothermic agent, preferably liquid carbon dioxide, and the process necessary to make such polystyrene foam.

The invention is particularly suited for making polystyrene foam sheet having beneficial physical properties for thermoforming purposes.

SUMMARY OF THE INVENTION

The present invention is a thermoplastic foam of a styrenic polymer with a blowing agent consisting essentially of carbon dioxide, about one percent to about thirty percent of an endothermic agent based on the total weight of the carbon dioxide and the endothermic agent and about 0.005 to about 1.0 weight percent based on styrenic polymer weight of a nucleating agent. This thermoplastic foam has less corrugation than thermoplastic foam produced under the same process conditions and at the same density using only carbon dioxide as the blowing agent.

The present invention is also a process for producing a thermoplastic foam. First, a styrenic polymer is melted, then a blowing agent consisting essentially of carbon dioxide is continuously directly introducing into the melted styrenic polymer. An endothermic agent in an amount of from about one percent to about thirty percent by total weight of the carbon dioxide and the endothermic agent is also continuously directly introducing into the melted styrenic polymer as is about 0.005 to about 1.0 weight percent of a nucleating agent based on styrenic polymer weight. The styrenic polymer, the carbon dioxide and the endothermic agent are intimately mixed and then extruded and foamed at a die temperature no greater than about 150° centigrade into a region of lower pressure to form a thermoplastic foam.

DETAILED DESCRIPTION OF THE INVENTION

Figure 1:
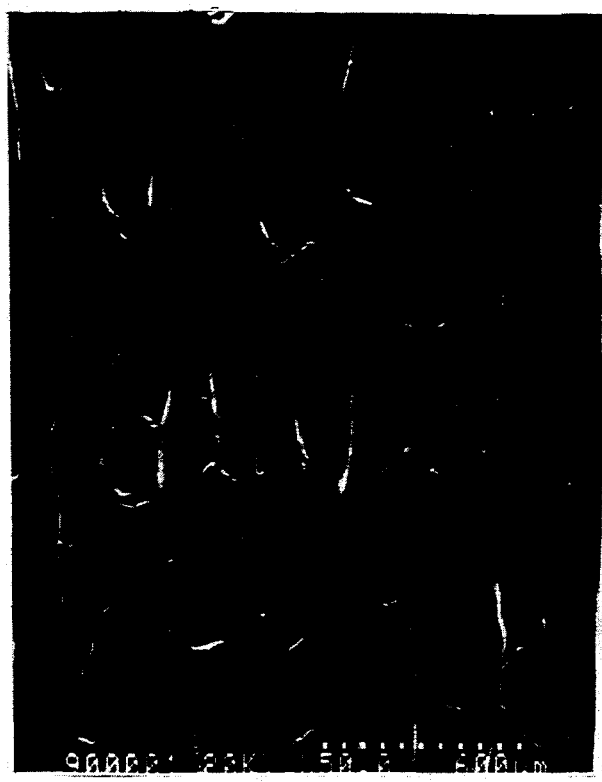
FIG. 1 and FIG. 2 are 50X machine-direction and cross-direction photomicrographs of the thermoplastic foam sheet of Example 2.

Polymers useful in the present invention are those polymers, copolymers and interpolymers having at least 70 percent by weight styrene monomer incorporated into the final resin as the monomeric repeat units. This includes other polymers such as for example styrene acrylonitrile, styrene acrylic acid, other known equivalents and blends having the styrene monomer repeat unit requirement. For the purpose of this invention these useful polymers shall be referred to as styrenic polymers. The preferred materials are styrenic homopolymers.

The blowing agent to be used would be that carbon dioxide which is normally commercially available. For the purposes of this specification such carbon dioxide shall be defined as 100 percent carbon dioxide even though this carbon dioxide may contain minor impurities or amounts of other compounds.

The carbon dioxide is preferably added to a polymer melt in a liquid form, although use of the carbon dioxide in the gaseous form would also be acceptable in the practice of the present invention.

The addition of a nucleating agent is required and is added in an amount of from about 0.005 to about 1.0 percent of the total polystyrene by weight. Preferably the amount of nucleating agent is between about 0.005 to about 0.5 percent. Most preferably the amount of nucleating agent is between about 0.005 to about 0.1. One preferred conventional nucleating agent is talc.

Other additives, such as pigments, conventionally known in the art may be added to the polystyrene foam of the present invention.

The endothermic agent are those endothermic agents which are not generally soluble in the polymer and have a heat absorption capability present upon the extrusion of the thermoplastic foam which is at least fifty percent of the heat absorption capability present in water. Water is the preferred endothermic agent.

The use of a tandem extrusion process for the manufacture of polystyrene foam sheet is typical, but is not required. Such a process includes a primary extruder, a blowing agent addition system into the primary extruder, a secondary extruder, an annular die, a cooling mandrel, a sheet cutter or slitter and a sheet gathering device, such as for example rollers and winders.

However, the use of this exact equipment set-up is not required in the process of this invention.

Polystyrene foam sheet can be produced using carbon dioxide as the blowing agent and the endothermic agent provided certain modifications are made in the handling and the preparation of the polystyrene foam sheet. Preferably the carbon dioxide and the endothermic agent are continuously directly introduced or injected into the molten resin. Preferably the carbon dioxide is continuously directly injected as a high pressure liquid and the endothermic agent is injected as a liquid, either separately or with the carbon dioxide.

To produce foam sheet having a density in the range of about 2 to about 10 pounds per cubic foot (PCF), preferably about 3 to about 6 PCF, about 0.5 to about 6 weight percent, preferably about 1 to about 4 weight percent of carbon dioxide is required per weight of polymer. The endothermic agent is present in an amount of from about 0.1 weight percent to about 1.0 weight percent by styrenic polymer weight. A required limitation is that the endothermic agent be present in an amount of from about one weight percent to about thirty weight percent, preferably from about three percent to about eighteen percent and most preferably from about four percent to about fourteen percent by total weight of the carbon dioxide and the endothermic agent. A nucleating agent, preferably talc, is also required and is added in an amount of from about 0.005 to about 1.0 percent, preferably about 0.005 to about 0.5 percent of the total polystyrene by weight most preferably about 0.005 to about 0.1.

Cell sizes in all directions are less than 1 millimeter (mm), and preferably less than about 0.5 mm. The thickness of the foam sheet is preferably less than about 0.5 inch and more preferably less than about 0.25 inch.

It is possible to have a blow up ratio, that is a stretching of the foam over a mandrel after it exits a die, greater than 4:1. It is preferable to have a blow up ration of at least 2.0:1.

The foaming temperature at the die is no greater than 150° C. and preferably between 135° and 150° C. The thermoplastic foam is extruded and foamed into a zone of lower pressure preferably air at atmospheric pressure.

While it may be possible to use a polystyrene foam sheet immediately it is preferred to age the polystyrene foam sheet for a period of time, usually at least about 20 hours prior to thermoforming the foam sheet. This will allow time for air to counter diffuse into the cells. It will also render the tensile elongation values substantially constant. This will provide uniform thermoforming characteristics and improved finished part physical properties for the polystyrene foam sheet to be thermoformed.

Substantially constant tensile elongation values over an extended period of time obtained with a minimum of aging of the foam sheet would yield more consistent results upon thermoforming the foam sheet, thus more consistent product with less scrap. The tensile elongation values would preferably be in excess of five percent and would remain above five percent for an extended period of time, thus allowing the storage of foam sheet for an extended period of time before thermoforming without worrying about the changing values or the degradation below five percent of the tensile elongation values of the foam sheet.

The tensile elongation values are determined according to the method ASTM D638 "Tensile Properties of Plastics" published by the American Society for Testing and Materials (ASTM). The words machine or extrusion direction, transverse or cross direction and vertical direction are used in their normal and conventional manners.

Though the tensile elongation values of the foam sheet of the present invention are not perfectly constant, they are substantially constant and even more important for thermoforming, the tensile elongation values remain above a value of five percent for an extended period of time. Generally when these values fall below five percent the foam sheet becomes too brittle for thermoforming.

The thermoforming temperature will be somewhat higher than that of a polystyrene foam sheet blown with fully or partially halogenated chlorofluorocarbon or hydrocarbons since the $CO_2$ provides essentially no solvent effect which would normally lower the heat distortion temperature and therefore the melt strength of the foam walls upon reheating. The polystyrene foam sheet blown with $CO_2$ and an endothermic agent can be post expanded in a range of about 20 to about 50 percent during thermoforming. It is preferred that the polystyrene foam sheet be aged for at least 20 hours prior to the carefully controlled thermoforming of the foam sheet.

Corrugation

It is also possible with the present invention to make 3-6 PCF foam sheet blown with $CO_2$ and an endothermic agent having less corrugation than a 3-6 PCF foam sheet blown with only $CO_2$.

For the purpose of definition "less corrugation" means that there are less gauge bands, which are the corrugation peaks and valleys in the foam sheet, or that the Sheet Gauge Standard Deviation is less when compared to an equivalent foam sheet prepared under equivalent conditions and blown with only carbon dioxide. Alternatively in the present invention, it is possible to obtain a lower density foam sheet with equivalent corrugation.

EXAMPLE 1 AND COMPARATIVE EXAMPLE 1

Table 1 shows the process conditions and results for an Example and a Comparative Example. The extruder had a 90 millimeter die with a 0.027 inch die gap. The polystyrene resin used had about a 300,000 Mw (molecular weight).

TABLE 1

| 100% $CO_2$ vs. $CO_2$/Water Blend | | |
|---|---|---|
| | Comparative Example 1 100% $CO_2$ | Example 1 $CO_2$/water |
| wt. % $CO_2$ (based on resin) | 3.6 | 3.6 |
| wt. % Water (based on resin) | 0 | 0.2 |
| % Water based on $CO_2$ & Water | 0 | 5.3 |
| wt. % Talc (based on resin) | 0.08 | 0.08 |
| Die Melt Temperature, °C. | 138 | 138 |
| Extruder Pressure, psi | 3900 | 3900 |
| Die Pressure, psi | 2760 | 2680 |
| Output Rate, lbs/hr | 273 | 273 |
| Sheet Gauge Average, in. | .156 | .146 |
| Sheet Gauge Range, in. | 0.132–0.174 | 0.133–0.159 |
| Sheet Gauge Standard Deviation | 12.7 | 7.8 |
| Sheet Density, lb/cu. ft. | 2.65 | 2.76 |

As can be seen in Table 1, the addition of a very small amount of water in an equivalent process using 100 percent carbon dioxide produces a foam sheet having about the same density, shows a 38.6 percent decrease in the sheet Gauge Standard Deviation.

EXAMPLE 2 AND COMPARATIVE EXAMPLE 2

The extruder had a 2 inch die with a 0.025 inch die gap. The resin used had about a 300,000 Mw (molecular weight).

TABLE 2

| 100% $CO_2$ vs. $CO_2$/Water Blend | | |
|---|---|---|
| | Comparative Example 2 100% $CO_2$ | Example 2 $CO_2$/water |
| wt. % $CO_2$ (based on resin weight) | 2.23 | 1.6 |
| wt. % Water (based on resin weight) | 0 | 0.45 |
| Water based on $CO_2$ & Water | 0 | 22.0 |
| 5 wt. % Talc (based on resin weight) | 0.7 | 0.7 |
| Die Melt (Foaming) Temp. °C. | 145 | 145 |
| Extruder Pressure, psi | 4970 | 4950 |
| Die Pressure, psi | 2450 | 2460 |
| Output Rate, lbs/hr | 30.5 | 30.5 |
| Sheet Gauge, in. | 92 | 77 |
| Sheet Density, lbs/cu. ft. | 5.46 | 5.23 |
| Gauge Bands Across Web | 8 | 0 |

As can be seen in Table 2, the addition of water with a decrease in the amount of carbon dioxide used in an equivalent process produces a foam sheet having about the same density, with a smaller gauge (thickness) and no gauge bands. There is an 8 to 0 reduction in the number of gauge bands across the web (the annular thermoplastic foam output from the die).

Figure 2:
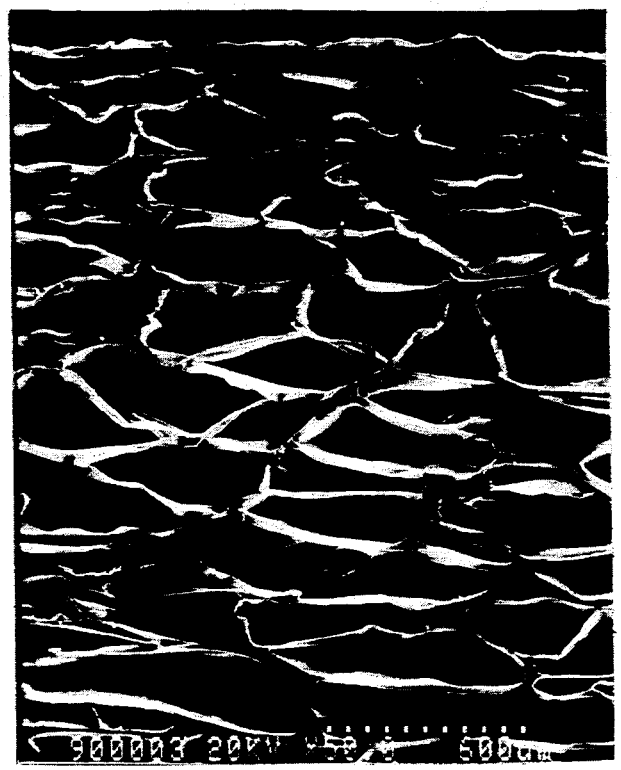

As can be seen in FIGS. 1 and 2, which are 50 times blowup machine-direction and photomicrographs of Example 2, there is no secondary foaming or small cells at junction points between membranes of the foam. The cells appear to be basically one size rather than a combination of large and small cells.

ADDITIONAL EXAMPLES AND COMPARATIVE EXAMPLES

Additional examples and additional comparative examples are prepared according to the parameters stated in Example 2 with various different water levels and carbon dioxide levels.

TABLE 3

| Gauge Bands vs. Weight Percent Water Added | |
|---|---|
| Amount of Water | Gauge Bands Across Web |
| <0.1 wt % water | 8 |
| 0.1 to 1.0 wt. % water | 0 |
| >1.0 wt. % water | 8 |

As can be seen in Table 3, the gauge bands across the web disappear at a water level of 0.1 to 1.0 wt. % water based on resin weight.

Interestingly the gauge bands across the web are the greatest (the most corrugated) when the amount of water is either too low or too high (greater than about thirty weight percent based on the total weight of the water and carbon dioxide).

As is clear in these examples and comparative examples, corrugation can be minimized or even prevented when using carbon dioxide as a sole blowing agent by including the proper amount of an endothermic agent, such as water into the foamable mixture prior to forming the thermoplastic foam sheet.

The use of a proper amount of an endothermic agent allows the production of a thermoplastic foam having a greater density and less corrugation than a comparable thermoplastic foam produced using only carbon dioxide. Use of an endothermic agent will also produce, due to an increased die temperature, greater quantities of a thermoplastic foam having a lower density with an equivalent corrugation to a thermoplastic foam in an equivalent process for producing an equivalently corrugated thermoplastic foam produced using only carbon dioxide. Also, under equivalent process conditions, the use of an endothermic agent produces a thermoplastic foam with less corrugation than a comparable thermoplastic foam produced using only carbon dioxide at equivalent densities.

The present invention has been described with preferred embodiments. It is to be understood however that modifications and variations may be resorted to, without departing from the spirit and scope of the invention, as those skilled in the art will readily understand. These modifications and variations are considered to be within the scope and purview of the appended claims.

What is claimed is:

1. A thermoplastic foam comprising:
   (a) a styrenic polymer;
   (b) a blowing agent consisting essentially of carbon dioxide; and
   (c) an endothermic agent present in an amount from about one percent to about thirty percent by total weight of the carbon dioxide and the endothermic agent; and
   (d) a nucleating agent in an amount of about 0.005 to about 1.0 weight percent based on styrenic polymer weight;
wherein any blowing agent consists essentially of carbon dioxide, and wherein the thermoplastic foam has less corrugation than a thermoplastic foam produced under equivalent process conditions without the endothermic agent.

2. A thermoplastic foam, as recited in claim 1, wherein the endothermic agent is present in an amount of from about three percent to about eighteen percent by total weight of the carbon dioxide and the endothermic agent.

3. A thermoplastic foam, as recited in claim 1, wherein the endothermic agent is present in an amount of from about four percent to about fourteen percent by total weight of the carbon dioxide and the endothermic agent.

4. A thermoplastic foam, as recited in claim 1, wherein the endothermic agent is water.

5. A thermoplastic foam, as recited in claim 4, wherein the water is present in an amount of from about three percent to about eighteen percent by total weight of the carbon dioxide and the water.

6. A thermoplastic foam, as recited in claim 4, wherein the water is present in an amount of from about four percent to about fourteen percent by total weight of the carbon dioxide and the water.

7. A thermoplastic foam, as recited in claim 1, wherein the thermoplastic foam has tensile elongation values greater than or equal to about five percent over an extended period of time under ambient conditions in both a machine and a cross direction.

8. A thermoplastic foam, as recited in claim 1, wherein the thermoplastic foam has substantially constant tensile elongation values equal to or greater than five percent over an extended period of time under ambient conditions in both a machine and a cross direction after an initial aging period.

9. A thermoplastic foam, as recited in claim 1, wherein the substantially constant tensile elongation values in either a machine and a cross direction under ambient condition vary by no more than about fifteen percent after an initial aging period of 20 hours.

10. A thermoplastic foam, as recited in claim 1, wherein the thermoplastic foam has corrugation less than about ten percent.

11. A thermoplastic foam, as recited in claim 1, wherein the thermoplastic foam has a density of about 2 to about 10 pounds per cubic foot.

12. A thermoplastic foam, as recited in claim 11, wherein the thermoplastic foam has a density of about 2 to about 6 pounds per cubic foot.

13. A thermoplastic foam, as recited in claim 10, wherein the thermoplastic foam is in a sheet form.

14. A thermoplastic foam, as recited in claim 1, wherein the thermoplastic foam has a thickness less than about 0.5 inch.

15. A thermoplastic foam, as recited in claim 14, wherein the thermoplastic foam has a thickness less than about 0.25 inch.

16. A thermoplastic foam, as recited in claim 1, wherein the thermoplastic foam has a cell size, in any direction, of less than about one millimeter.

17. A thermoplastic foam, as recited in claim 16, wherein the thermoplastic foam has a cell size, in any direction, of less than about 0.5 millimeter.

18. A thermoplastic foam, as recited in claim 1, wherein the thermoplastic foam has a blow up ratio of at least about 2.0:1.

19. A thermoplastic foam, as recited in claim 1, wherein the thermoplastic foam has about 0.005 to about 0.5 weight percent of a nucleating agent based on polymer weight.

20. A thermoplastic foam, as recited in claim 16, wherein the thermoplastic foam has 0.005 to about 0.1 of a nucleating agent based on polymer weight.

21. A thermoplastic foam, as recited in claim 1, wherein the thermoplastic foam expands about 20 to about 50 percent upon heating prior to thermoforming.

22. A thermoplastic foam, as recited in claim 1, wherein the thermoplastic foam has carbon dioxide present in an amount of about 0.5 to about 6 weight percent by weight of the styrenic polymer immediately after being extruded from a die and foamed.

23. A thermoplastic foam, as recited in claim 1, wherein the endothermic agent is present in an amount of from about 0.1 weight percent to about 1.0 weight percent by styrenic polymer weight.

24. A process for producing a thermoplastic foam comprising the following steps:
   (a) melting a styrenic polymer;
   (b) continuously directly introducing into the melted styrenic polymer a blowing agent consisting essentially of carbon dioxide, wherein any blowing agent consists essentially of carbon dioxide,;
   (c) continuously directly introducing into the melted styrenic polymer an endothermic agent in an amount of from about one percent to about thirty percent by total weight of the carbon dioxide and the endothermic agent;
   (d) adding continuously a nucleating agent in an amount of about 0.005 to about 1.0 weight percent based on styrenic polymer weight;
   (e) mixing intimately the styrenic polymer, the carbon dioxide and the endothermic agent; and
   (f) extruding and foaming the mixture at a die temperature no greater than about 150° centigrade into a region of lower pressure to form a thermoplastic foam.

25. A process for producing a thermoplastic foam, as recited in claim 24, wherein the endothermic agent is present in an amount of from about three percent to about eighteen percent by total weight of the carbon dioxide and the endothermic agent.

26. A process for producing a thermoplastic foam, as recited in claim 24, wherein the endothermic agent is present in an amount of from about four percent to about fourteen percent by total weight of the carbon dioxide and the endothermic agent.

27. A process for producing a thermoplastic foam, as recited in claim 24, wherein the the endothermic agent is water.

28. A process for producing a thermoplastic foam, as recited in claim 24, wherein the water is present in an amount of from about three percent to about eighteen percent by total weight of the carbon dioxide and the water.

29. A process for producing a thermoplastic foam, as recited in claim 24, wherein the water is present in an amount of from about four percent to about fourteen percent by total weight of the carbon dioxide and the water.

30. A process for producing a thermoplastic foam, as recited in claim 24, wherein the carbon dioxide is introduced into the polymer melt as a liquid.

31. A process for producing a thermoplastic foam, as recited in claim 30, wherein the carbon dioxide is continuously and directly introduced into the melted styrenic polymer as a liquid in an amount of about 0.5 to about 6 weight percent by weight of the styrenic polymer.

32. A process for producing a thermoplastic foam, as recited in claim 24, wherein the the endothermic agent is present in an amount of from about 0.1 weight percent to about 1.0 weight percent by styrenic polymer weight.

33. A process for producing a thermoplastic foam, as recited in claim 24, including the step of thermoforming the thermoplastic foam into articles.

34. A process for producing a thermoplastic foam, as recited in claim 24, including the step of passing the thermoplastic foam over a forming mandrel having a blow up ratio of greater than about 2.0:1 immediately after step (e).

35. A process for producing a thermoplastic foam, as recited in claim 24, wherein the styrenic polymer is polystyrene.

36. A process for producing a thermoplastic foam, as recited in claim 24, wherein the die temperature in step (e) is between 135° centigrade to about 150° centigrade.

37. A process for producing a thermoplastic foam, as recited in claim 24, wherein, under equivalent process conditions, the thermoplastic foam has a greater density and less corrugation than a thermoplastic foam produced under equivalent process conditions without the endothermic agent.

38. A process for producing a thermoplastic foam, as recited in claim 24, wherein the thermoplastic foam has equivalent density with equivalent corrugation to a thermoplastic foam produced under equivalent process conditions without the endothermic agent, but is extruded, foamed and formed in greater quantities due to an increased foaming temperature when compared to an equivalent process for producing an equivalently corrugated thermoplastic foam produced without the endothermic agent.

39. A process for producing a thermoplastic foam, as recited in claim 24, wherein, under equivalent process conditions, the thermoplastic foam has less corrugation than a thermoplastic foam produced under equivalent process conditions having an equivalent density produced without the endothermic agent.

40. A process for producing a thermoplastic foam, as recited in claim 24, including the step of adding a nucleating agent in an amount of about 0.005 to about 0.5 weight percent based on styrenic polymer weight.

41. A process for producing a thermoplastic foam, as recited in claim 24, including the step of adding a nucleating agent in an amount of about 0.005 to about 0.1 weight percent based on styrenic polymer weight.

42. The thermoplastic foam produced by the process of claim 24.

43. A thermoplastic foam, as recited in claim 24, wherein the endothermic agent is water.

44. A process for producing a thermoplastic foam, as recited in claim 24, wherein the foam produced is in sheet form.

45. A thermoplastic foam, as recited in claim 44, wherein the endothermic agent is water.

* * * * *